(12) United States Patent
Harada et al.

(10) Patent No.: US 12,158,738 B2
(45) Date of Patent: Dec. 3, 2024

(54) PRESS MACHINE AND OPERATION SETTING METHOD OF PRESS MACHINE

(71) Applicant: AIDA ENGINEERING, LTD., Sagamihara (JP)

(72) Inventors: Yasuhiro Harada, Sagamihara (JP); Shintaro Bando, Ebina (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 455 days.

(21) Appl. No.: 17/702,364

(22) Filed: Mar. 23, 2022

(65) Prior Publication Data

US 2022/0308540 A1 Sep. 29, 2022

(30) Foreign Application Priority Data

Mar. 24, 2021 (JP) ................. 2021-050077

(51) Int. Cl.
*G05B 19/042* (2006.01)
*G06F 3/04847* (2022.01)

(52) U.S. Cl.
CPC ....... *G05B 19/042* (2013.01); *G06F 3/04847* (2013.01); *G05B 2219/2622* (2013.01)

(58) Field of Classification Search
None
See application file for complete search history.

(56) References Cited

U.S. PATENT DOCUMENTS

| 5,732,619 A | 3/1998 | Hata et al. |
| 5,791,887 A | 8/1998 | Williams et al. |
| D429,700 S | 8/2000 | Liebig |

(Continued)

FOREIGN PATENT DOCUMENTS

| CN | 1209862 A | 3/1999 |
| CN | 1958279 A | 5/2007 |

(Continued)

OTHER PUBLICATIONS

Müller, Peter, et al. "Experimental and numerical modal analysis of a servo-screw press with coupled drives as a basis for increasing flexibility and dynamics." Production Engineering 9 (2015): 203-214 (Year: 2015).*

(Continued)

*Primary Examiner* — Carlos R Ortiz Rodriguez
(74) *Attorney, Agent, or Firm* — Rimon P.C.

(57) ABSTRACT

A press machine includes a display that displays a plurality of images, and a processor that generates a plurality of images corresponding to a slide operation and a movement operation. The plurality of images include a first image having an annular shape, a second image having an arc shape, and a third image. A first region of the second image represents a movement time required for the movement operation, a third region represents a stop time required for a slide stop process, and a second region represents a delay time until the slide stop process starts after the movement time elapses. The processor displays the third image on the display as a determination element for determining whether the slide operation and the movement operation are settable in a relationship between the slide operation and the movement operation based on an input from the user interface.

9 Claims, 10 Drawing Sheets

(56) References Cited

U.S. PATENT DOCUMENTS

| | | | |
|---|---|---|---|
| D678,098 S | 3/2013 | Saikawa et al. |
| 8,972,055 B1 | 3/2015 | Desai et al. |
| D740,301 S | 10/2015 | Soegiono et al. |
| D761,812 S | 7/2016 | Motamedi |
| D781,736 S | 3/2017 | Friedli |
| D797,756 S | 9/2017 | Meyer et al. |
| D826,297 S | 8/2018 | Yan et al. |
| D826,999 S | 8/2018 | Yan et al. |
| D839,215 S | 1/2019 | Odegard |
| D840,355 S | 2/2019 | Simon |
| D859,596 S | 9/2019 | Lance et al. |
| D867,410 S | 11/2019 | Du et al. |
| D869,477 S | 12/2019 | Yoon et al. |
| D869,490 S | 12/2019 | Rondoni et al. |
| D874,962 S | 2/2020 | Friedli |
| D888,722 S | 6/2020 | Calzada et al. |
| D888,732 S | 6/2020 | Momchilov et al. |
| D890,773 S | 7/2020 | Pascoli et al. |
| D919,638 S | 5/2021 | Marsolek et al. |
| 11,034,116 B2 | 6/2021 | Koshimizu |
| D940,731 S | 1/2022 | Collins et al. |
| D942,469 S | 2/2022 | Abdullah et al. |
| D964,385 S | 9/2022 | Fang et al. |
| D986,269 S | 5/2023 | Bahatyrevich et al. |
| D994,679 S | 8/2023 | Ayuso Perez et al. |
| D997,181 S | 8/2023 | Chu et al. |
| 2007/0003214 A1 | 1/2007 | Toyoda et al. |
| 2012/0017147 A1 | 1/2012 | Mark |
| 2017/0217116 A1 | 8/2017 | Takeuchi |
| 2017/0334160 A1 | 11/2017 | Masato et al. |
| 2019/0291375 A1 | 9/2019 | Harada |
| 2020/0180252 A1 | 6/2020 | Sakurai et al. |
| 2020/0338849 A1 | 10/2020 | Harada et al. |

FOREIGN PATENT DOCUMENTS

| | | | |
|---|---|---|---|
| CN | 102985896 A | 3/2013 |
| CN | 105867803 A | 8/2016 |
| EP | 1820580 A1 | 8/2007 |
| JP | H05-57500 A | 3/1993 |
| JP | H09-225696 A | 9/1997 |
| JP | H10-137994 A | 5/1998 |
| JP | H11-245098 A | 9/1999 |
| JP | 2000-015495 A | 1/2000 |
| JP | 2003-245800 A | 9/2003 |
| JP | 2003-260599 A | 9/2003 |
| JP | 2004-017098 A | 1/2004 |
| JP | 2004-058152 A | 2/2004 |
| JP | 2005-014015 A | 1/2005 |
| JP | 2013-184222 A | 9/2013 |
| JP | 2014-054642 A | 3/2014 |
| JP | D1608486 S | 7/2018 |
| JP | D1608825 S | 7/2018 |
| JP | 2019-166552 A | 10/2019 |
| JP | 2020-179417 A | 11/2020 |
| KR | 20100009775 A | 1/2010 |
| KR | 101116735 B1 | 3/2012 |
| WO | 2016/027645 A1 | 2/2016 |
| WO | 2019/058653 A1 | 3/2019 |

OTHER PUBLICATIONS

Notice of Allowance issued in U.S. Appl. No. 16/356,744, dated May 20, 2021.

Office Action issued in the corresponding European Patent Application No. 19161133.4 dated Dec. 7, 2022.

Extended European Search Report issued in the corresponding European Patent Application No. 22162913.2 dated Aug. 23, 2022.

Office Action issued in the corresponding U.S. Appl. No. 29/648,936 dated Mar. 29, 2023.

Chinese Office Action issued in the corresponding Chinese Patent Application No. 201910221054.3 dated Jul. 5, 2021, with English machine translation.

Zhan et al., "Experimental Study on Control of Variable Speed Input Controllable Stamping Mechanism Based on PC" Journal of Shunde Polytechnic, vol. 13, No. 4, Oct. 2015, with English machine translation.

Non-Final Rejection issued in corresponding U.S. Appl. No. 16/356,744, dated Jan. 22, 2021.

Extended European Search Report issued in corresponding European Patent Application No. 19161133.4-1019, dated Sep. 2, 2019.

Second Office Action issued in corresponding CN Application No. 201910221054.3, dated Feb. 9, 2022 w/ Machine English Translation (17 pages).

Extended European search report dated Oct. 12, 2023 issued in the relevant European Patent Application No. 19161133.4.

Japanese Office Action issued in JP Patent Application No. 2021-050077, dispatched on Dec. 12, 2023 (w/ Computer generated English translation).

Ex Parte Quayle Action dated Oct. 3, 2023 issued in the relevant Design U.S. Appl. No. 29/648,936.

\* cited by examiner

PRESS MACHINE AND OPERATION SETTING METHOD OF PRESS MACHINE

CROSS-REFERENCE TO RELATED APPLICATION

This application claims the benefit of Japanese patent application No. 2021-050077, filed on Mar. 24, 2021, which is hereby incorporated by reference in its entirety.

BACKGROUND

The present invention relates to a press machine and an operation setting method of the press machine.

In a press machine, as a method for detecting a position (crank angle) of a slide, for example, a case where an encoder is attached to a crank shaft is well known. A timing switch for a press machine outputs a timing signal for activating (ON) or stopping (OFF) an accessory device (including an accessory and accessory device attached to a press main body and an external peripheral device) by using an output from the encoder is also well known. For example, JP 9-225696 A discloses a timing switch using an output of an encoder. Also, for example, as a setting method for a timing switch for operation of activation or stopping of an accessory device, for example, JP 2004-58152 A discloses a method of displaying operation start and operation end timing switches on an interface in a table format and inputting numerical values in the table.

In the setting of the operation in such an accessory device, there is a problem that it is difficult for the operator to intuitively imagine how much margin there is to avoid interference between a slide motion (hereinafter referred to as "slide operation") that is defined as a slide position for each stroke (time or crank angle) and the operation of the accessory device. In particular, a skilled operator may imagine the slide operation as rotational operation of an eccentric mechanism that drives the slide, and set the operation of the accessory device according to the rotation angle. Since the conventional tabular interface depends on a skill level of the operator, there is a possibility that the operation setting may be different from the one intended by the operator as a result. For this reason, in a case of a servo press machine whose slide operation can be arbitrarily changed, a higher degree of skill is required for the setting.

A press machine and an operation setting method of the press machine is proposed in JP 2020-179417 A, which allow the operator to set the operation of the accessory device while visually recognizing the relationship between the operation of the slide after setting and the operation of the accessory device.

SUMMARY

The invention can provide a press machine and an operation setting method of the press machine which allow an operator to set slide operation and movement operation while visually easily recognizing a relationship between the slide operation and the movement operation of a workpiece material.

According to a first aspect of the invention, there is provided a press machine configured to perform press processing by converting rotation of an electric motor into reciprocating linear motion of a slide by an eccentric mechanism that converts rotational motion into linear motion, the press machine including:

a user interface configured to accept an input operation;
a display configured to display a plurality of images; and
a processor configured to generate the plurality of images corresponding to a slide operation of the slide and a movement operation of a workpiece material input from the user interface, the plurality of images displayed on the display including: a first image which has an annular shape, corresponds to a rotational operation of the eccentric mechanism and represents one stroke of the slide operation; a second image which has an arc shape and is concentric with the first image; and a third image displayed on the second image or on an extension line of the second image near a starting end and a terminating end of the second image, the first image including at least one slide operation region, the second image including a first region corresponding to the movement operation linked with the press machine, a second region coupled to a terminating end of the first region, and a third region coupled to a terminating end of the second region, the first region representing a movement time required for the movement operation, the third region representing a stop time required for a slide stop process for stopping the slide when the movement operation is defective, the second region representing a delay time until the slide stop process starts after the movement time elapses, and the processor is configured to display the third image on the display as a determination element for determining whether the slide operation and the movement operation are settable in a relationship between the slide operation and the movement operation based on an input from the user interface.

According to a second aspect of the invention, there is provided an operation setting method of a press machine that performs press processing by converting rotation of an electric motor into reciprocating linear motion of a slide by an eccentric mechanism that converts rotational motion into linear motion, a processor of the press machine displaying on a display: a first image which has an annular shape, corresponds to a rotational operation of the eccentric mechanism and represents one stroke of a slide operation; a second image which has an arc shape, and is concentric with the first image; and a third image displayed on the second image or on an extension line of the second image near a starting end and a terminating end of the second image, the processor determining whether the slide operation and the movement operation are settable in a relationship between the slide operation and the movement operation of a workpiece material based on an input operation from the user interface, the processor executing a process for displaying the first image, the second image and the third image on the display after a change as a result of the determination, the first image including at least one slide operation region, the second image including a first region corresponding to the movement operation linked with the press machine, a second region coupled to a terminating end of the first region, and a third region coupled to a terminating end of the second region, the first region representing a movement time required for the movement operation, the third region representing a stop time required for a slide stop process for stopping the slide when the movement operation is defective, and the second region representing a delay time until the slide stop process starts after the movement time elapses.

DESCRIPTION OF EMBODIMENTS

Figure 1:
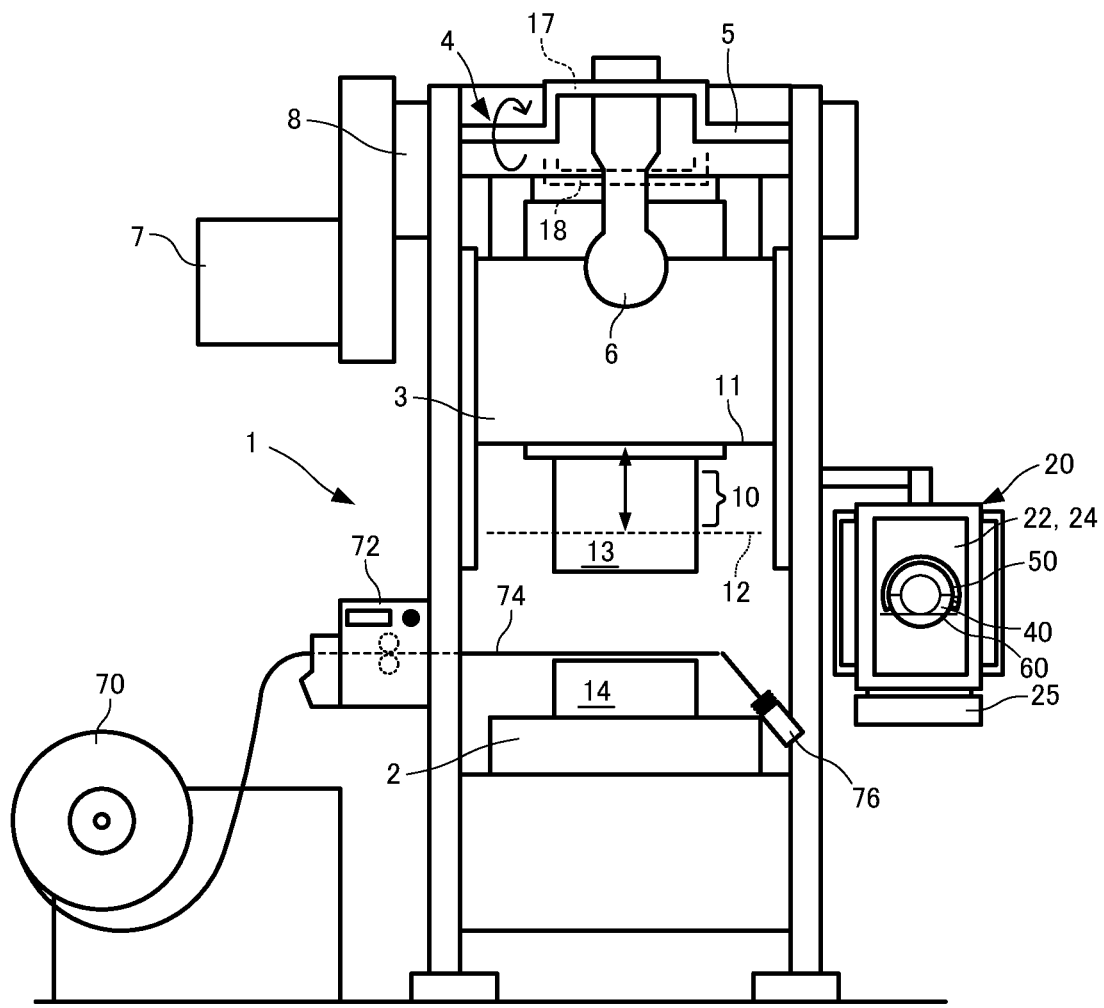
FIG. 1 is a front view of a press machine and a moving device according to an embodiment of the invention.

The invention has been made to solve at least part of the above problem, and can be implemented as aspects or application examples described below.

(1) According to an aspect of the invention, there is provided a press machine configured to perform press processing by converting rotation of an electric motor into reciprocating linear motion of a slide by an eccentric mechanism that converts rotational motion into linear motion, the press machine including:

a user interface configured to accept an input operation;

a display configured to display a plurality of images; and a processor configured to generate the plurality of images corresponding to a slide operation of the slide and a movement operation of a workpiece material input from the user interface, the plurality of images displayed on the display including: a first image which has an annular shape, corresponds to a rotational operation of the eccentric mechanism and represents one stroke of the slide operation; a second image which has an arc shape, and is concentric with the first image; and a third image displayed on the second image or on an extension line of the second image near a starting end and a terminating end of the second image, the first image including at least one slide operation region, the second image including a first region corresponding to the movement operation linked with the press machine, a second region coupled to a terminating end of the first region, and a third region coupled to a terminating end of the second region, the first region representing a movement time required for the movement operation, the third region representing a stop time required for a slide stop process for stopping the slide when the movement operation is defective, the second region representing a delay time until the slide stop process starts after the movement time elapses, and the processor is configured to display the third image on the display as a determination element for determining whether the slide operation and the movement operation are settable in a relationship between the slide operation and the movement operation based on an input from the user interface.

According to the above aspect of the press machine, the operator may set the slide operation and the movement operation while visually easily recognizing the relationship between the slide operation and the movement operation by the positions of the first image, the second image, and the third image displayed on the display.

(2) In one aspect of the press machine, the third image may include at least one straight line extending in a horizontal direction, and the display may be configured to indicate that the slide operation and the movement operation are settable by displaying the third region above the straight line, and indicate that the slide operation and the movement operation are not settable by displaying at least a portion of the third region below the straight line.

According to the above aspect of the press machine, by representing the third image in a straight line, the operator may visually easily recognize whether the slide operation and the movement operation are settable by the position of the third region with respect to the straight line.

(3) In one aspect of the press machine, the user interface may be configured to be capable of changing a movement start position of the movement operation by moving a starting end of the first region in accordance with the input operation, and the processor may be configured to, when the movement start position is changed, execute a determination process for determining whether the movement operation after the change is settable with respect to the slide operation, and execute a display process for displaying the second image and the third image after the change on the display as a determination result of the determination process.

According to the above aspect of the press machine, the operator may visually recognize whether movement operation after the change is settable with respect to the slide operation when the movement start position of the workpiece material is changed, so that the operator may change the set value with confidence.

(4) In one aspect of the press machine, the user interface may be configured to be capable of moving a display position of the third image in accordance with the input operation, and the processor may be configured to, when the display position of the third image is changed by the input operation to the user interface, execute a determination process for determining whether the movement operation is settable with respect to the slide operation after the change, and execute a display process for displaying the third image and the second image after the change on the display as a determination result of the determination process.

According to the above aspect of the press machine, the operator may visually recognize whether the movement operation is settable when the third image is moved, so that the operator may change the display position of the third image with confidence.

(5) In one aspect of the press machine,
the slide operation region may be a pendulum-type slide operation region corresponding to a pendulum operation of the eccentric mechanism,
the user interface is configured to change an inverted position of the pendulum operation by moving at least one end of the pendulum-type slide operation region in accordance with the input operation, and
the processor may be configured to, when the inverted position is changed, execute a determination process for determining whether the movement operation is settable with respect to the slide operation after the change, and execute a display process for displaying the first image, the second image and the third image after the change on the display as a determination result of the determination process.

According to the above aspect of the press machine, the operator may visually recognize whether the movement operation is settable with respect to the slide operation after the change when the inverted position of the pendulum operation is changed, so that the operator may change the inverted position with confidence.

(6) In one aspect of the press machine,
the display process may include further displaying at least one of distance information and time information on the display as the determination element.

According to the above aspect of the press machine, by displaying information such as distance information, the operator may specifically recognize the clearance of the movement operation with respect to the slide operation, so that more detailed slide operation is settable.

(7) According to an aspect of the invention, there is provided an operation setting method of a press machine that performs press processing by converting rotation of an electric motor into reciprocating linear motion of a slide by an eccentric mechanism that converts rotational motion into linear motion,
a processor of the press machine displaying on a display:
a first image which has an annular shape, corresponds to a rotational operation of the eccentric mechanism and represents one stroke of a slide operation; a second image which has an arc shape, and is concentric with the first image; and a third image displayed on the second image or on an extension line of the second image near a starting end and a terminating end of the second image,
the processor determining whether the slide operation and the movement operation are settable in a relationship between the slide operation and the movement operation of a workpiece material based on an input operation from the user interface,
the processor executing a process for displaying the first image, the second image and the third image on the display after a change as a result of the determination,
the first image including at least one slide operation region,
the second image including a first region corresponding to the movement operation linked with the press machine, a second region coupled to a terminating end of the first region, and a third region coupled to a terminating end of the second region, the first region representing a movement time required for the movement operation,
the third region representing a stop time required for a slide stop process for stopping the slide when the movement operation is defective, and
the second region representing a delay time until the slide stop process starts after the movement time elapses.

According to the above aspect of the operation setting method for the press machine, by displaying the first image, second image, and third image after the change on the display as the determination result, the operator may visually easily recognize whether the slide operation and the movement operation are settable.

According to the above aspect of the press machine and the above aspect of the operation setting method of the press machine, the operator may set the movement operation while visually easily recognizing the slide operation and the movement operation.

Preferred exemplary embodiments of the invention will be described below in detail using the drawings. Note that the embodiments described below do not unduly limit the scope of the invention as stated in the claims. Moreover, all of the components described below are not necessarily essential requirements of the invention.

1. Press Machine

Figure 2:
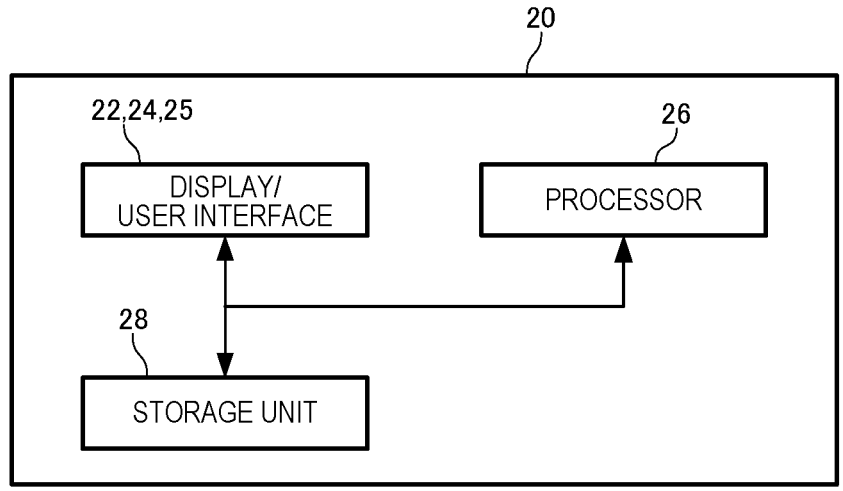
FIG. 2 is a block diagram of an operating panel of a press machine according to an embodiment of the invention.
Figure 3:
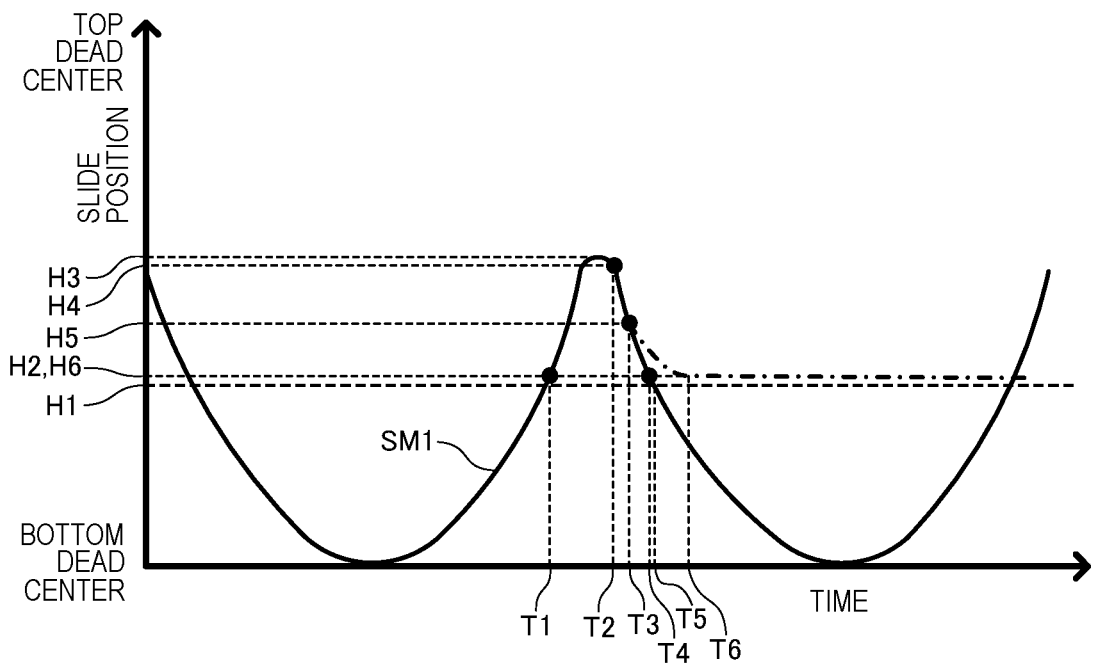
FIG. 3 illustrates a slide operation in pendulum operation.

With reference to FIGS. 1 to 3, an overview of a press machine 1 will be described. FIG. 1 is a front view of a press machine 1 and a moving device 72 according to an embodiment of the invention, and FIG. 2 is a block diagram of an operating panel 20 of the press machine 1 according to the present embodiment, and FIG. 3 illustrates a slide operation SM1 in pendulum operation.

1-1. Overview of Press Machine

As illustrated in FIG. 1, the press machine 1 converts rotation of an electric motor 7 into reciprocating linear motion of a slide 3 by an eccentric mechanism 4 that converts rotational motion into linear motion, and performs press processing. The moving device 72 is linked with the press machine 1. The moving device 72 repeats the movement operation for intermittently feeding a workpiece material 74 to the press machine 1.

The press machine 1 includes the eccentric mechanism 4 including a crankshaft 5 and a connecting rod 6, an electric motor 7 configured to drive the eccentric mechanism 4, a reduction mechanism 8 coupling the eccentric mechanism 4 and an electric motor 7, and an operating panel 20 configured to perform various configurations and operation of the press machine 1. The press machine 1 may be a servo press machine, or may be a mechanical press machine that further includes a clutch, a flywheel, etc. (not illustrated).

As the electric motor 7, an AC servo motor (a synchronous motor or an inductive motor can be selected), a DC servo motor, etc. can be employed.

The eccentric mechanism 4 is not limited to a crank mechanism using the crankshaft 5, and can employ a crank mechanism including an eccentric axis. Also, as the eccentric mechanism 4, a known slide drive mechanism used for the press machine 1, for example, a booster mechanism by a knuckle mechanism, a linkage mechanism, etc. can be used. Also, a mechanism including an eccentric plate made integrally with a main gear can be used. The crankshaft 5 rotates by drive of the electric motor 7 between a top dead center 17 and a bottom dead center 18 (indicated by dashed lines in FIG. 1).

Dies (upper die 13 and lower die 14) are fixed to a bolster 2 and the slide 3, respectively. The slide 3 coupled to the lower end side of the connecting rod 6 ascends and descends with respect to the bolster 2 by rotating the crankshaft 5 by driving the electric motor 7. A movement range 10 in which the slide 3 ascends and descends in the vertical direction is a range between an ascending limit 11 and a descending limit 12 (indicated by a dashed line in FIG. 1).

The moving device 72 is disposed adjacent to the press machine 1, for example, to feed the sheet-shaped workpiece material 74 between the upper and lower die 13, 14 in an open state. In FIG. 1, the moving device 72 is fixed to one side of the press machine 1. The moving device 72 is a so-called feed device including a pair of rollers sandwiching the workpiece material 74. The moving device 72 intermittently feeds, matching with pressing operation, the workpiece material 74 to between the dies of the press machine 1 by a predetermined distance, according to the preset movement operation. The moving device 72 may include an uncoiler 70 configured to hold the workpiece material 74, and a misfeed detector 76 configured to confirm the movement completion of the movement operation. The moving device 72 may be retrofitted to the press machine 1 as an accessory device, or may be provided as part of the press machine 1. The moving device 72 will be described as an example of a feed device configured to feed the workpiece material 74 in one direction, but may be a known transfer device configured to hold and transport the workpiece material 74 by a plurality of fingers attached to the feed bar.

The uncoiler 70 winds and holds the sheet-shaped workpiece material 74 in a coil shape, and rotates the coil-shaped workpiece material 74 to feed it out to the moving device 72 at a constant speed.

The misfeed detector 76 has a function of confirming that the workpiece material 74 is fed to a predetermined position by the moving device 72 (movement completion). The misfeed detector 76 is disposed on the opposite side across the die from the moving device 72, and fixed to the press machine 1. The misfeed detector 76 may be arranged at a position where it can be detected that the workpiece material 74 is in the movement completion position where the press processing can be started. The misfeed detector 76 illustrates an example of a contact type configured to detect by contacting the tip of the workpiece material 74 in the feed direction, but may be a non-contact type using an optical sensor or a magnetic sensor, or may approximate the position of the workpiece material 74 from the output related to the movement operation of the moving device 72 in place of the misfeed detector 76. In addition, in a case where the moving device 72 is a transfer device, the misfeed detector 76 may further include a detector of a holding error at the finger and a position detector of the feed bar, and may include a function of confirming the withdrawal of the finger in addition to a function of confirming the movement completion. This is because, in the transfer device, the finger enters the position where it interferes with the die, and thus it is necessary to confirm that the finger is withdrawn to a position where the finger does not interfere with the die.

1-2. Operating Panel

The operating panel 20 includes a user interface 24 and a second user interface 25 configured to accept input operation, a display 22 configured to display a plurality of images, and a processor 26 configured to generate a plurality of images corresponding to the slide operation of the slide 3 and the movement operation of the workpiece material 74 input from the user interface 24. The plurality of images displayed on the display 22 include at least a first image 40, a second image 50, and a third image 60. The first image 40 corresponds to rotational operation of the eccentric mechanism 4, and is an annular image representing one stroke of the slide operation. The one stroke corresponds to operation from the start of descent to the end of ascent of the slide 3, and to operation of reciprocating the slide 3 only once. The second image 50 corresponds to the movement operation of the moving device 72 and a slide stop process, and the third image 60 represents a determination element for determining whether the slide operation and the movement operation are settable.

The operating panel 20 is attached to the press machine 1 and is electrically coupled to the press machine 1 and the moving device 72. The operating panel 20 performs various configurations and operation of the press machine 1 by an operator operating the press machine 1. The operating panel 20 may further perform various configurations and operation of the moving device 72, or may transmit and receive various signals to and from the moving device 72.

The display 22 displays images generated by the processor 26. The display 22 is described as part of the operating panel 20, but is not limited thereto, and may be physically independent of the operating panel 20 as a display device for displaying the operating state of the press machine 1. Such a display device may be a display of a portable terminal such as a tablet personal computer or smart phone, for example, and the portable terminal may further include a part of the function such as the processor 26 of the operating panel 20. In that case, the display device and the operating panel 20 both have a communication function for transmitting and receiving data between the display device and the operating panel 20. The display 22 is a liquid crystal screen (LCD). Other known display devices (e.g., organic Electro Luminescence (EL) displays, etc.) may be used as display 22. The display 22 can display various user interfaces (Graphical User Interface (GUI)) for the operator.

The user interface 24 is provided, for example, at the display 22. The user interface 24 is a touch panel type that is integrally provided with the display 22, and the input operation for the user interface 24 can be performed in touch operation. The operator can change the displayed first image 40, the second image 50, and the third image 60 by inputting to the user interface 24 on the display 22 with touch operation, so that operability is improved. When it is determined that the first image 40 and the second image 50 changed by the input operation for the user interface 24 are settable by the processor 26, the slide operation and the movement operation corresponding to the first image 40 and the second image 50 after the change are stored in a storage unit 28 by further input operation. The touch panel type can perform operation of the user interface 24 by directly touching the display 22 with a finger or a pen. As the touch panel, a known type of touch panel such as a resistive film method, electrostatic capacitance method, surface type electrostatic capacitance method, projection type electrostatic capacitance method, etc. can be used. The user interface 24 is not limited to a touch panel type integral with the display 22, may be a panel that can be attached to and detached from the display 22, or may adopt a known input means (for example, a mouse, a trackball, a keyboard, etc.) provided separately from the display 22, as long as the operation of changing the first image 40, the second image 50, the third image 60, etc. displayed on the display 22 is possible. A physical button, etc. that is operated by the operator is disposed at the second user interface 25. The second user interface 25 includes an input means that can be operated in place of the touch panel type user interface 24 and an input means for operation different than the user interface 24. The user interface 24 and the second user interface 25 may perform the input operation of numerical information corresponding to each image to change the first image 40, the second image 50, and the third image 60.

As illustrated in FIG. 2, the operating panel 20 includes the processor 26 and a storage unit 28 that electrically couple with the display 22, the user interface 24, and the second user interface 25.

The processor 26 is a Central Processing Unit (CPU), and executes a process of press processing by executing a program stored in the storage unit 28. Additionally, the processor 26 can set the slide operation and the movement operation according to the input operation for the user interface 24 and the second user interface 25 by the operator, and can change and set the slide operation and the movement operation stored in the storage unit 28 in advance. Specifically, the processor 26 generates the first image 40, the second image 50, the third image 60, etc. corresponding to the slide operation and the movement operation, and can execute a process for displaying these generated images on the display 22. Furthermore, the processor 26 generates the first image 40, etc. corresponding to the slide operation and the like, which is changed by input operation to the user interface 24, etc., and can execute a process for displaying these generated images on the display 22. Furthermore, the processor 26 can execute a process for determining whether the slide operation and the movement operation after the change are settable in a relationship between the slide operation and the movement operation of the workpiece material 74 based on the input operation from the user interface 24 and the second user interface 25. The processor 26 can execute a process for displaying the first image 40, the second image 50, and the third image 60 after the change on the display 22 as a result of the determination. Furthermore, when the processor 26 determines that it is settable, the processor 26 can store the slide operation and the movement operation after the change in the storage unit 28 and set, cause the press machine 1 to execute the press processing according to the slide operation and the movement operation after the setting stored in the storage unit 28, and cause the moving device 72 to execute the movement of the workpiece material 74.

The storage unit 28 stores the program and setting data of the press machine 1. For example, the storage unit 28 stores the data of the slide operation and the movement operation when the press machine 1 is a servo press machine. In accordance with the slide operation data stored in the storage unit 28 and set, in this case, the processor 26 outputs a command to a servo motor which is the electric motor 7, and operates the slide 3 in accordance with the preset slide operation data by driving the servo motor in accordance with this command. The processor 26 operates the moving device 72 according to the data of the movement operation stored in the storage unit 28 and set.

1-3. Slide Operation and Movement Operation

The slide operation data can be represented by one cycle of an operating curve of the slide 3, such as, for example, the slide operation SM1 in the pendulum operation illustrated in FIG. 3, which is typically represented with the slide position of the slide 3 (the stroke of the slide 3) (mm) in the vertical axis, and the time (sec) in the horizontal axis. The slide operation SM1 in FIG. 3 indicates the so-called pendulum-type slide operation in which the slide 3 is inverted at an inverted position H3 and descends again without returning to the top dead center. Although FIG. 3 illustrates substantially two strokes, the slide operation from the bottom dead center to the next bottom dead center may be considered as one stroke in relation to the movement operation. The movement operation is an operation of the moving device 72 from the start of feeding the workpiece material 74 to the stop of the workpiece material 74. An interference position H1 is a height of the slide 3 where it is likely to generate interference between the press machine 1 and the moving device 72, and is a value set in accordance with the die. Here, "interference between the press machine 1 and the moving device 72" is interference between a portion of the press machine 1 (including the die) and a portion of the moving device 72 (including the workpiece material 74 that is moved by the moving device 72). The interference between the press machine 1 and the moving device 72 is, for example, in the present embodiment, interference between the upper die 13 of the press machine 1 and the workpiece material 74 fed by the moving device 72, but also includes interference between the upper die 13 and the fingers in a case where the moving device 72 is a transfer device. Thus, in a case where the moving device 72 executes the movement operation in a range where the slide 3 is in a position higher than the interference position H1 in the slide operation SM1, interference between the workpiece material 74 and the die does not occur.

With reference to FIGS. 1 and 3, a relationship between the slide operation and the movement operation by the moving device 72 will be described. In the example in FIG. 3, when the slide 3 ascends after the press processing and exceeds the interference position H1 near the center of the lateral axis, the moving device 72 starts the movement operation at a movement start position H2 (time T1), and feeds the workpiece material 74 to between the ascending upper die 13 and the lower die 14. When the preset movement operation is executed successfully, the tip of the workpiece material 74 is brought into contact with the misfeed detector 76 at a movement completion position H4 (time T2) after passing the inverted position H3 of the slide 3, and the misfeed detector 76 outputs the movement completion signal to stop the movement device 72. When there is abnormality in the movement operation and the output signal from the misfeed detector 76 is not confirmed even after the movement completion position H4 (time T2) has passed, the moving device 72 outputs a defective signal of the movement operation to the control unit (for example, the operating panel 20) of the press machine 1 at a confirmation position H5 (time T3). The press machine 1 executes a preset slide stop process based on this output. The slide stop process stop controls the electric motor 7 by a command of the processor 26 to decelerate the slide 3 (indicated by a dot-dash line), and stop the slide 3 at a stop position H6 (time T6) that is higher than the interference position H1. It is conceivable that a spacing between the stop position H6 (time T4) and the interference position H1 (time T5) in the slide operation SM1 is a range in which the operator can adjust the slide operation and the movement operation in order to increase the production speed.

For example, when programs of the slide operation and the movement operation in FIG. 3 are set in the storage unit 28, the time T1 to the time T2 is the "feed time" required for the movement operation, the time T3 to the time T4 is the "stop time" required for the slide stop process for stopping the slide 3 when the movement operation is defective, and the time T2 to the time T3 is the "delay time" until the slide stop process is started after the feed time has elapsed. The stop time is calculated as the time in which the processor 26 can stop the slide 3 in the shortest time from the speed of the slide 3 at the time T3.

The operator of the conventional press machine can recognize the feed time, which is a set value, but it is difficult to recognize the height of the slide 3 at the time T2, and is also difficult to recognize the movement distance (H5-H6) of the slide 3 required from the time T3 until the slide 3 stops. Further, since the confirmation position H5 changes depending on the response speed of the misfeed detector 76 and the moving device 72, it is difficult for the operator to recognize the "delay time". Therefore, since the operator of the conventional press machine sets the inverted position H3 of the pendulum operation and the BASE SPM based on experience, the reality is that it is difficult to optimize the slide operation SM1 and the production speed because it has to be set with a large margin.

1-4. Display

As illustrated in FIG. 1, the operating panel 20 includes the display 22 and the user interface 24 in the front center, and includes the second user interface 25 below the display 22. The display 22 displays the first image 40, the second image 50, and the third image 60 as a setting screen for the pressing operation and the movement operation. Further, as illustrated in FIGS. 4 to 10, a determination result display region 54 and a plurality of numerical display regions 500, 510, 520, 530 and 540 are displayed on the display 22.

2. Image and Display Region

Figure 8:
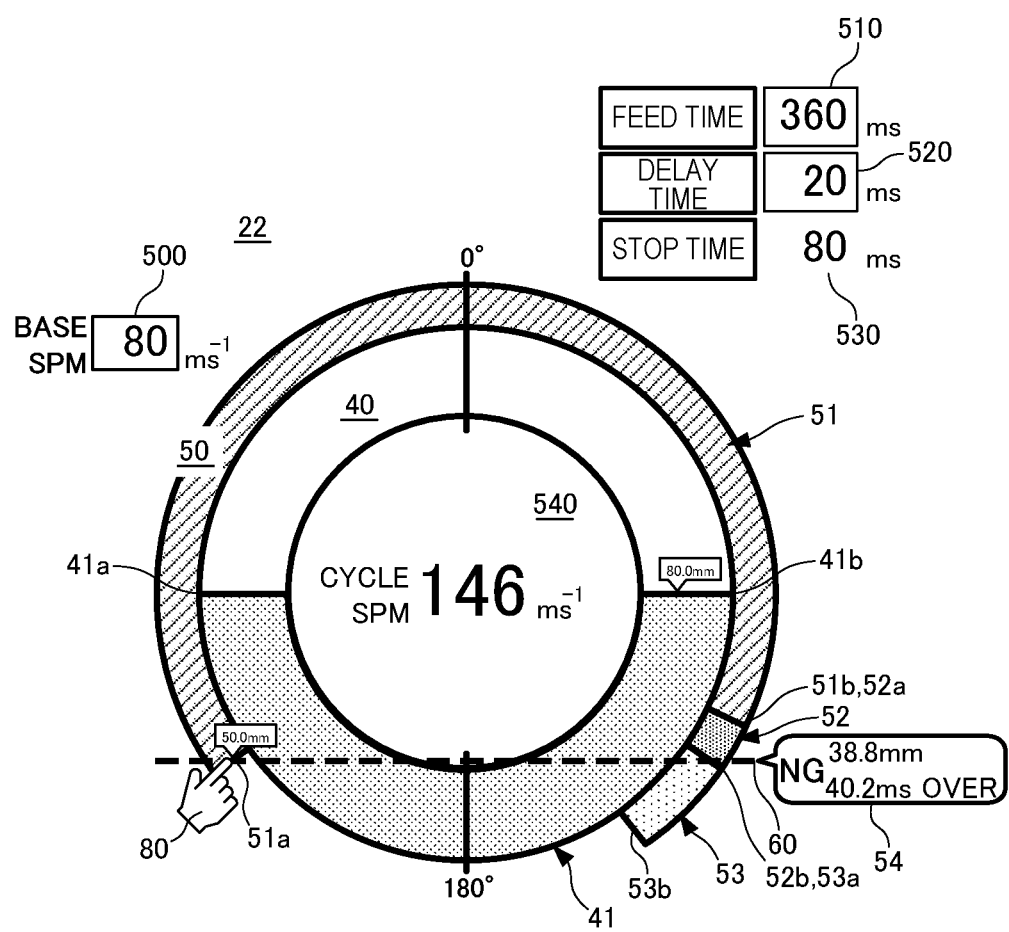
FIG. 8 is an enlarged view of a display of a press machine according to an embodiment of the invention.
Figure 9:
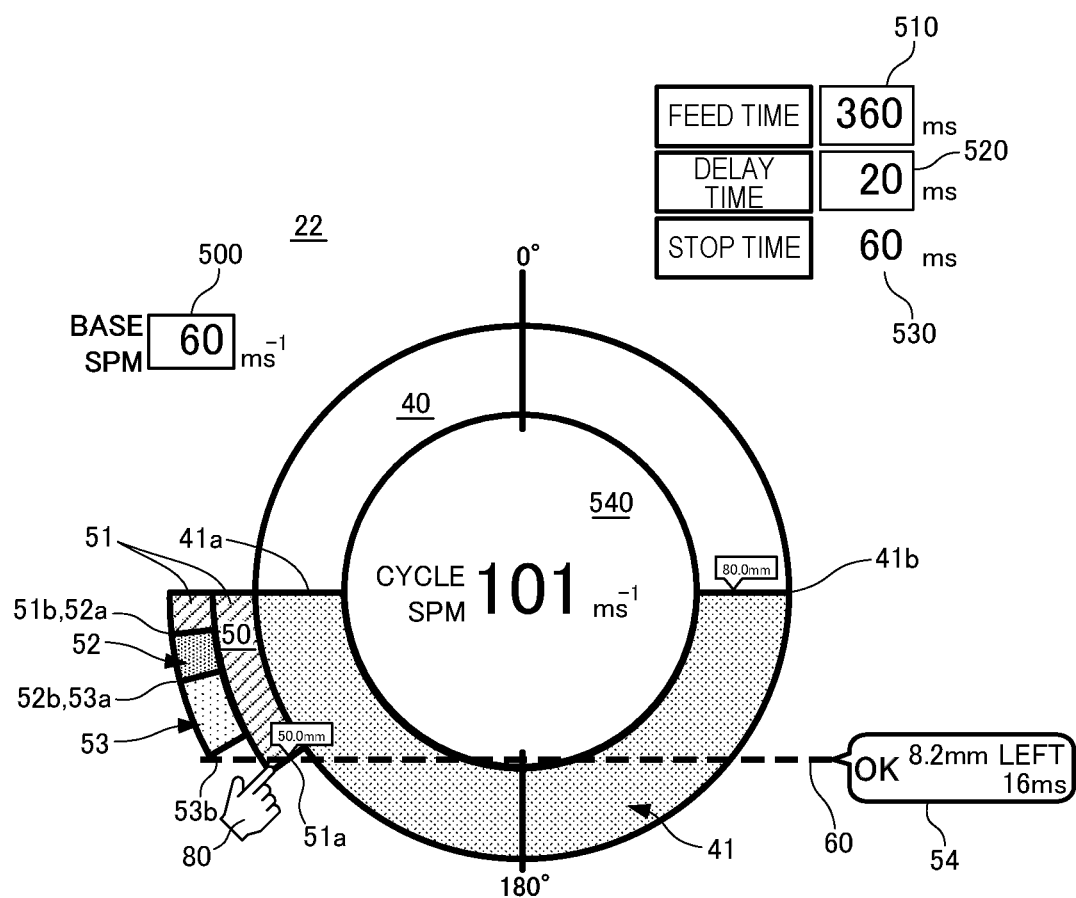
FIG. 9 is an enlarged view of a display of a press machine according to an embodiment of the invention.
Figure 10:
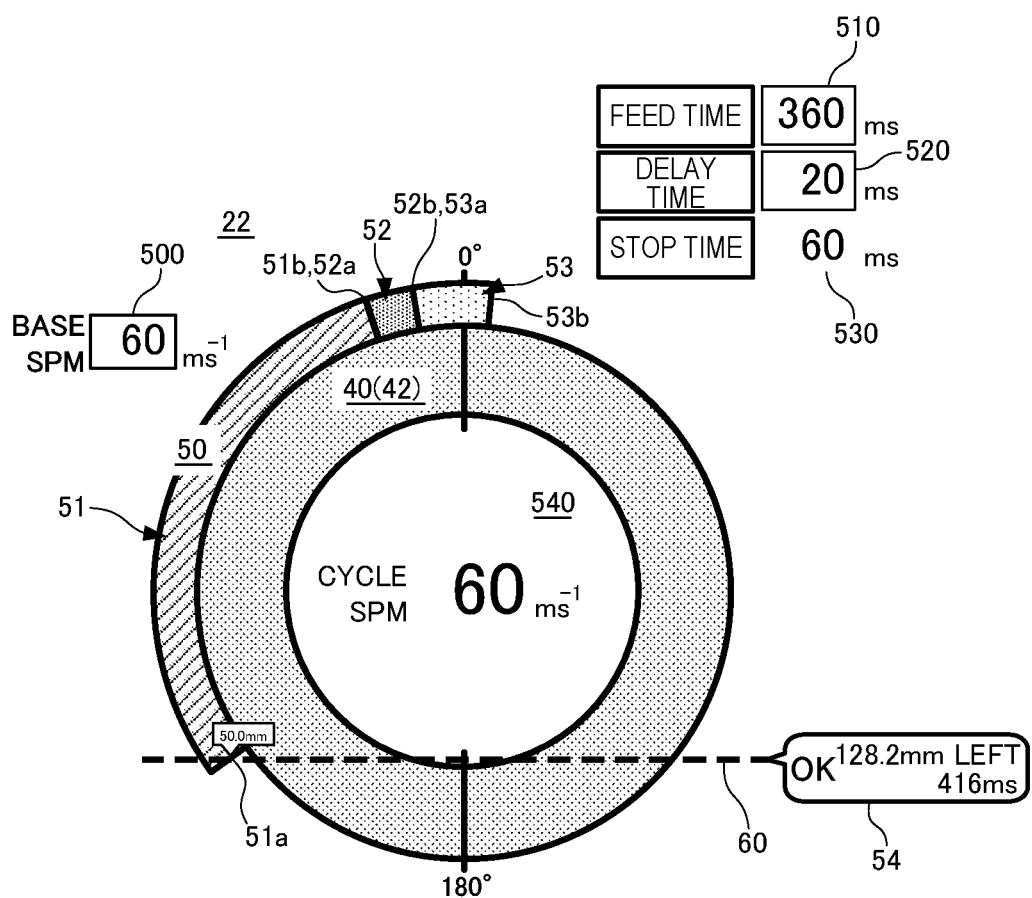
FIG. 10 is an enlarged view of a display of a press machine according to an embodiment of the invention.

With reference to FIGS. 4 to 10, images displayed on the display 22 of the press machine 1 described in FIGS. 1 to 3 will be described. FIGS. 4 to 10 are enlarged views of the display 22 of the press machine 1. FIGS. 4 to 9 illustrate the display 22 for setting the slide operation of the pendulum operation, and FIG. 10 illustrates the display 22 for setting the slide operation of the rotational operation.

The first image 40 and the second image 50 illustrated in FIGS. 4 to 10 may be images generated by the processor 26 based on the initial data of the slide operation and the movement operation which are the reference presets for the press machine 1 and the moving device 72, and may be images generated by the processor 26 based on the data of the slide operation and the movement operation after these are changed. Further, the third image 60 is an image generated by the processor 26 based on data preset depending on the die.

Figure 4:
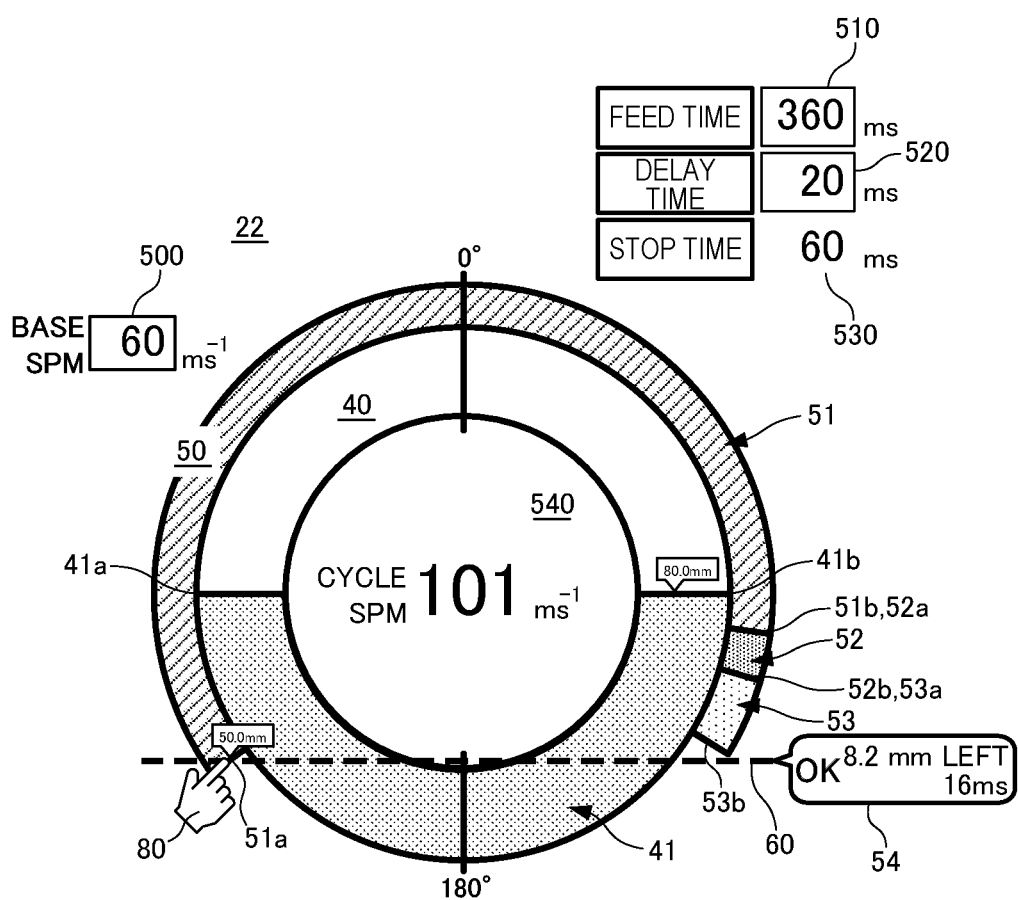
FIG. 4 is an enlarged view of a display of a press machine according to an embodiment of the invention.
Figure 5:
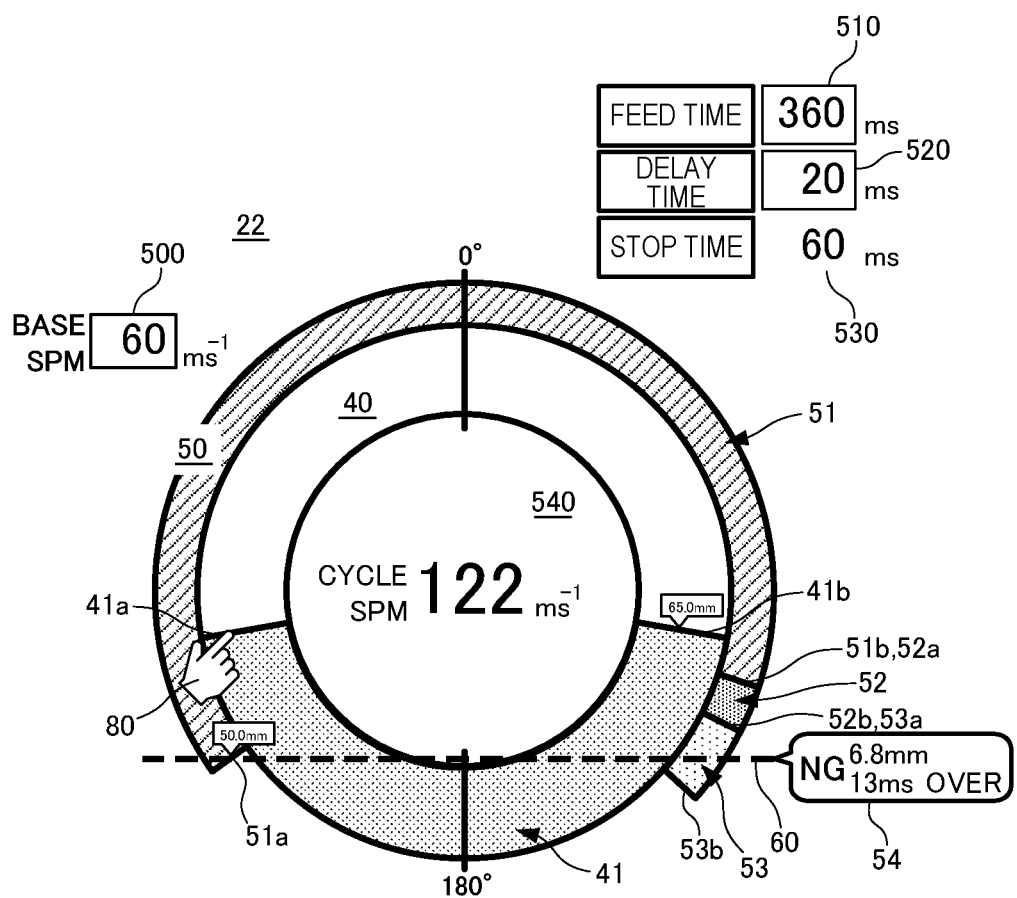
FIG. 5 is an enlarged view of a display of a press machine according to an embodiment of the invention.
Figure 6:
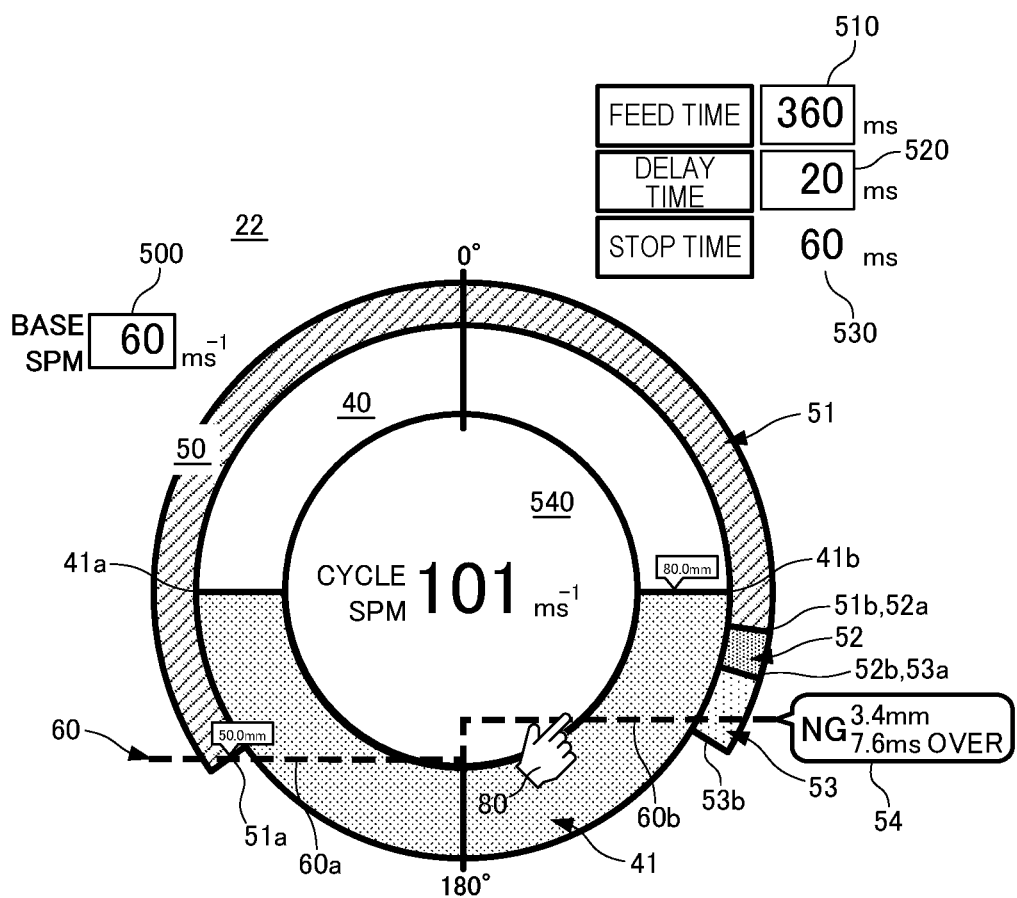
FIG. 6 is an enlarged view of a display of a press machine according to an embodiment of the invention.

As illustrated in FIGS. 4 to 6, the first image 40 is an annular image corresponding to the rotational operation of the eccentric mechanism 4 of the press machine 1. The first image 40 is a wide annular ring, the upper end thereof corresponds to the top dead center 17 of the crankshaft 5, and the lower end thereof corresponds to the bottom dead center 18 of the crankshaft 5. Thus, an interval of the upper end and the lower end of the first image 40 correspond to the movement range 10 in the linear motion of the slide 3.

At the upper end of the first image 40, "0°" is displayed as a rotation angle of the crankshaft 5, and at the lower end, "180°" is displayed as the rotation angle of the same. By configuring the first image 40 to be an annular image corresponding to the rotational operation of the eccentric mechanism 4, the operator is facilitated to visually recognize the slide operation, improving operability. Additionally, the width (thickness) of the first image 40 corresponds to the speed of the slide 3, and the maximum width of the first image 40 illustrated in FIG. 4 represents the maximum speed of the slide 3. Here, the speed of the slide 3 refers to the target speed, and the operating panel 20 issues a command to the electric motor 7 so that the slide 3 moves at that speed.

Figure 7:
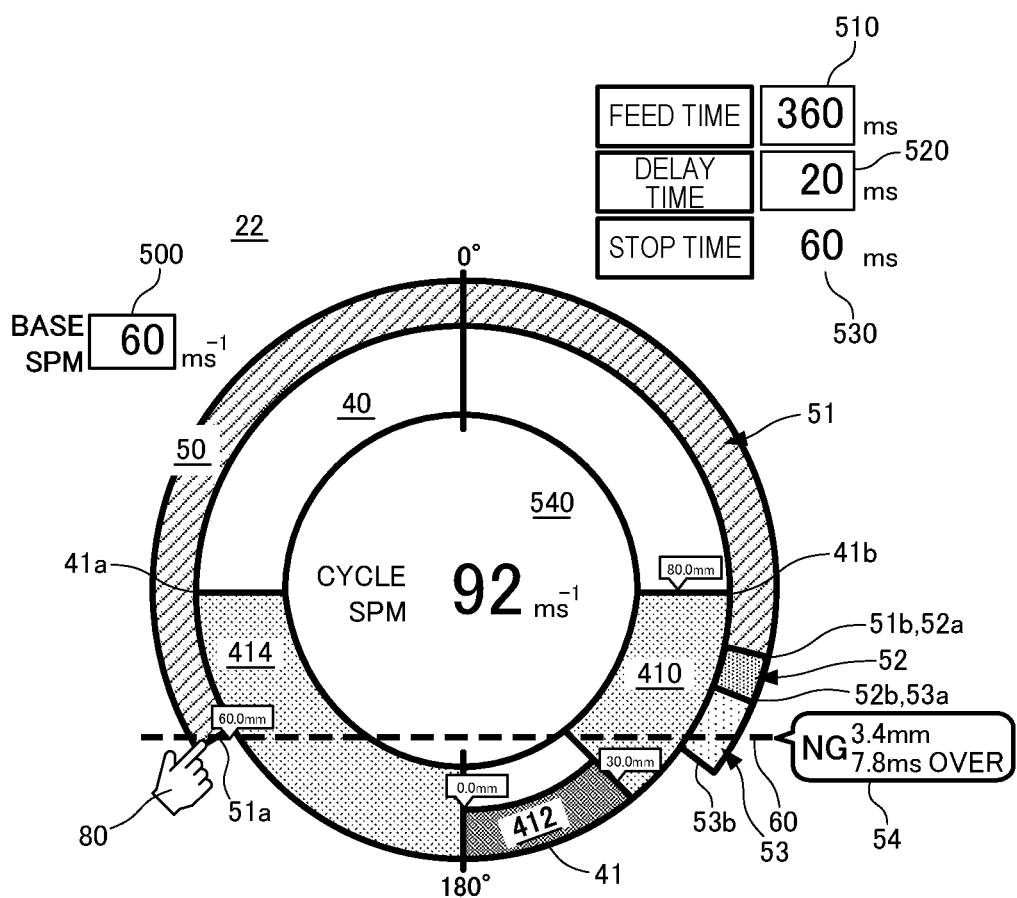
FIG. 7 is an enlarged view of a display of a press machine according to an embodiment of the invention.

The first image 40 includes at least one slide operation region (41, 42). The slide operation region of the first image 40 in FIGS. 4 to 9 is the pendulum-type slide operation region 41 corresponding to the pendulum operation of the eccentric mechanism 4. The pendulum-type slide operation region 41 is formed along the direction in which the first image 40 extends. The pendulum-type slide operation region 41 in FIGS. 4 to 6, 8 and 9 represents the pendulum-type slide operation in which the eccentric mechanism 4 rotates at a constant speed, and the pendulum-type slide operation region 41 in FIG. 7 represents the pendulum-type slide operation in which the eccentric mechanism 4 rotates at a plurality of speeds. As illustrated in FIG. 7, the pendulum-type slide operation region 41 can be divided into a plurality of slide operation regions 410, 412, and 414, and the set speed of the slide 3 can be changed by changing the width for each of the divided respective regions. In the example in FIG. 7, the width of the slide operation region 412 is narrowed and is set at a slower speed than the other slide operation regions 410 and 414. Also, a boundary of adjacent slide operation regions is movable along the direction in which the first image 40 extends in accordance with input operation to the user interface 24. The example of the slide operation region 412 in FIG. 7 illustrates that the slide operation region 410 is set to switch to the slide operation region 412 at a height of 30.0 mm from the bottom dead center (0.0 mm). However, when the boundary between the two regions 410 and 412 is moved along the first image 40, for example, to a height of 40.0 mm, the setting can be changed so that the slide operation region 410 is switched to the slide operation region 412 at the height of 40.0 mm from the bottom dead center. In this way, the operator can perform the input operation while visually recognizing the slide operation, and thus the press machine 1 has excellent operation setting operability.

The second image 50 is an arc-shaped image displayed concentrically on the first image 40. The second image 50 includes a first region 51 corresponding to the movement operation of the moving device 72 that is linked with the press machine 1, and a second region 52 coupled to a terminating end 51b of the first region 51, and a third region 53 coupled to a terminating end 52b of the second region 52. The second image 50 is disposed along the outer peripheral edge of the first image 40. The first region 51 to the third region 53 are disposed continuously. The first region 51 represents the feed time, the second region 52 represents the delay time, and the third region 53 represents the stop time.

The third image 60 is displayed on the second image 50 or on an extension line of the second image 50 near a starting end 51a and a terminating end 53b of the second image 50. The processor 26 displays the third image 60 on the display 22 as a determination element for determining whether the slide operation and the movement operation are settable in a relationship between the slide operation and the movement operation based on input from the user interface 24 or the second user interface 25. That is, the display 22 can represent the presence or absence of interference between the press machine 1 and the moving device 72 by a relative position between the third region 53 and the third image 60. For example, the relative position in the determination result that the slide operation and the movement operation are settable are represented such that that the third region 53 and the third image 60 are disposed at intervals indicating that the press machine 1 and the moving device 72 do not interfere with each other. Further, the relative position in the determination result that the slide operation and the movement operation are not settable are represented such that the third region 53 and the third image 60 are disposed in contact with each other, indicating the press machine 1 and the moving device 72 interfere with each other. By displaying the third region 53 according to the stop time and the third image 60 according to the interference position H1 on the display 22, the operator can visually easily recognize the presence or absence of interference between the press machine 1 and the moving device 72.

The third image 60 includes, for example, at least one straight line extending in a horizontal direction. In the present embodiment, the third image 60 is displayed in a dashed line, and can be moved up and down in the display 22 by the user interface 24. The display 22 indicates that the slide operation and the movement operation are settable by displaying the third region 53 above the straight line of the third image 60, and indicates that the slide operation and the movement operation are not settable by displaying at least a portion of the third region 53 below the straight line. By representing the third image 60 corresponding to the interference position H1 with a straight line, the operator may visually easily recognize whether the slide operation and the movement operation are settable by the position of the third region 53 with respect to the straight line. The example illustrated in FIGS. 4 to 9 indicates that there is interference between the upper die 13 and the workpiece material 74 when the terminating end 53b of the third region 53 is displayed entirely beyond the third image 60, so that the slide operation and the movement operation are not settable. Further, as illustrated in FIG. 6, the third image 60 may be represented by a plurality of straight lines, and may be, for example, a first straight line 60a and a second straight line 60b extending in a horizontal direction.

The first image 40, the second image 50, and the third image 60 will be described while comparing the slide operation SM1 in FIG. 3. The pendulum-type slide operation region 41 of the first image 40 corresponds to the slide operation SM1 of the pendulum operation in FIG. 3 that repeats the operation of descending from the inverted position H3 and folded back at the bottom dead center and then ascending to the inverted position H3. The third image 60 corresponds to the dashed line of the interference position H1 in FIG. 3. It can be understood that the pendulum-type slide operation region 41 (the slide operation SM1 in FIG. 3) in FIG. 4 is operation of ascending from the bottom dead center to the left side of FIG. 4 and reaches one end 41a (inverted position H3), and descending from the other end 41b (inverted position H3) on the right side of FIG. 4 to the bottom dead center. In that case, the starting end 51a of the first region 51 corresponds to the movement start position H2 (time T1) higher than the interference position H1 in FIG. 3, the terminating end 51b and the starting end 52a of the second region 52 correspond to the movement completion position H4 (time T2), the terminating end 52b and the starting end 53a of the third region 53 correspond to the confirmation position H5 (time T3), and the terminating end 53b corresponds to the stop position H6 (time T4) higher than the interference position H1.

The determination result display region 54 is displayed at the bottom right on the display 22, for example, in accordance with the display position of the third image 60. The determination result display region 54 is a region in which the result of the determination process executed by the processor 26 depending on the input operation from the user interface 24 or the second user interface 25 is displayed. For example, when there is no interference, at least one of the distance information and the time information is displayed in the determination result display region 54 as a determination element together with the display of "OK". By displaying the determination result display region 54 in addition to the determination result based on the relative position between the second image 50 and the third image 60, the operator can specifically recognize the clearance of the movement operation with respect to the slide operation.

The distance information is, for example, the difference between the stop position H6 and the interference position H1 in which the slide 3 in the slide operation SM1 in FIG. 3 is predicted to stop, and the time information is the difference between the time T4 and the time T5.

The numerical display region 500 displays the reference SPM (number of strokes per minute) in the slide operation of the forward rotation operation of the press machine 1 as "BASE SPM $(ms^{-1})$". As illustrated in FIG. 8, the operator can change the reference SPM by input operation for the user interface 24 or the second user interface 25. FIG. 8 illustrates an example in which a numerical value larger than that of FIG. 6 is input to the reference SPM, the second image 50 exceeds the third image 60, and the determination result display region 54 displays the determination result as "NG".

The numerical display regions 510, 520 and 530 displays the "feed time (ms)", "delay time (ms)", and "stop time (ms)" corresponding to the first region 51, the second region 52, and the third region 53 displayed on the display 22. The operator can input the "feed time" and "delay time" numerically from the user interface 24 or the second user interface 25, the numerical value is displayed in the numerical display regions 510 and 520, and the first region 51 and the second region 52 expand and contract along the second image 50.

The numerical display regions 520 and 530 display the calculation result calculated by the processor 26 as the shortest time. The second region 52 and the third region 53 expand and contract along the second image 50 in accordance with the numerical values of the numerical display regions 520 and 530.

The numerical display region 540 displays the result of the processor 26 calculating the SPM in the slide operation of the first image 40 displayed on the display 22 as "CYCLE SPM $(ms^{-1})$". In FIGS. 4 to 9, the SPM of the pendulum-type slide operation region 41 is displayed, and the SPM of the slide operation region 42 at the constant speed is displayed in FIG. 10.

FIG. 9 illustrates the same movement operation as FIG. 4, but is an example in which the second image 50 is only displayed on the one end 41a side of the first image 40. In the second image 50 in FIGS. 4 to 6, a portion extending from the one end 41a beyond the top dead center 17 to the other end 41b is merely displayed for convenience so as to correspond to the first image 40, and since it corresponds to the range in which the slide 3 is not actually operating, it does not correspond to actual movement operation. FIG. 9 is a representation closer to the actual movement operation. The first region 51 is doubly disposed inside and outside the arc. The inner first region 51 corresponds to the movement operation until the slide 3 ascends and flips at the one end 41a, and the outer first region 51 corresponds to the movement operation when the slide 3 flips and descends. By displaying as illustrated in FIG. 9, the operator more easily understands the relationship between the pendulum operation and the movement operation.

FIG. 10 illustrates a forward rotation operation that causes the crank shaft 5 to rotate in one direction at the constant speed, and the slide 3 is repeatedly passed from the top dead center 17 through the bottom dead center 18 to the top dead center 17 again. The first image 40 displays the annular slide operation region 42. In the case of such a forward rotation operation, the slide 3 ascends to the top dead center 17, and thus the spacing between the third region 53 and the third image 60 is wide, and interference is less likely to occur. By displaying as illustrated in FIG. 10, it is easy for the operator to grasp the movement operation even in the forward rotation operation, for example, in a mechanical press.

For operation and the determination process of the first image 40, the second image 50, and the third image 60 will be described in "3. Operation Setting Method of Press Machine" below.

3. Operation Setting Method of Press Machine

Figure 11:
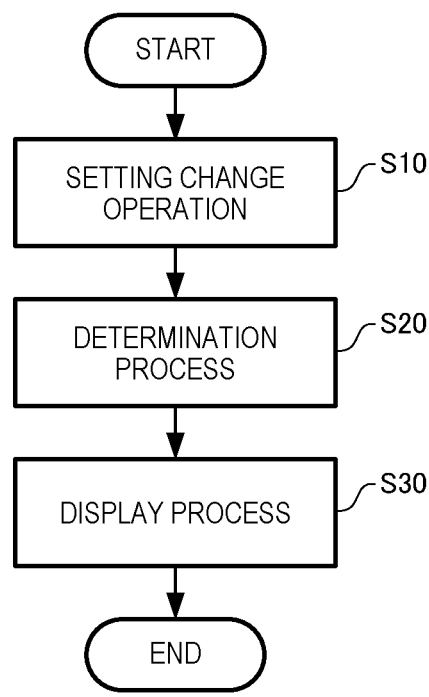
FIG. 11 is a flowchart of an operation setting method of a press machine according to an embodiment of the invention.

With reference to FIG. 11, an operation setting method of the press machine 1 described using FIGS. 1 to 10 will be described. FIG. 11 is a flowchart of the operation setting method of the press machine 1.

As illustrated in FIG. 11, the operation setting method of the press machine 1 includes setting change operation (S10), a determination process (S20), and a display process (S30). Before performing the setting change operation (S10), the first image 40, the second image 50, and the third image 60 are displayed on the display 22.

Setting change operation (S10): The operator of the press machine 1 performs input operation on the first image 40, the second image 50, and the third image 60 displayed on the display 22 using the user interface 24 and/or the second user interface 25 of the operating panel 20 in order to change the slide operation of the press machine 1 and the movement operation of the moving device 72.

As input operation, an operation method used in a smartphone such as a tap, a pinch-in, a pinch-out, a swipe, a drag, etc. may be employed by the operator to contact the finger 80 with respect to the touch panel type user interface 24. As input operation, the second user interface 25 described above and other known devices may be employed. For example, the operation may be performed by the input using a keyboard image, or by clicking, dragging, dropping, etc. a cursor displayed on the display 22 by using a mouse to the first image 40, the second image 50, the third image 60, etc. The input to the numerical display regions 500, 510 and 520 may be input using a numeric keypad of the second user interface 25.

Determination process (S20): The processor 26 executes a determination process for determining whether the slide operation and the movement operation are settable in a relationship between the slide operation based on the input operation from the user interface 24 and/or the second user interface 25 by the setting change operation (S10) and the movement operation of the workpiece material 74. In the determination process, the processor 26 determines that it is not settable in a case where the press machine 1 and the moving device 72 interfere with each other when operated by the slide operation after the change and the movement operation after the change, and determines that it is settable when they do not interfere with each other.

Display process (S30): The processor 26 executes a process for displaying, on the display 22, the first image 40, the second image 50, and the third image 60 after the change as a result of determination by the determination process (S20). The slide operation and the movement operation determined to be settable in the determination process (S20) are stored in the storage unit 28 by the input operation of the user interface 24, and are set in the operation program of the press machine 1 and the moving device 72. The press machine 1 and the moving device 72 are capable of executing the press processing according to the slide operation and the movement operation after the setting.

Examples of the setting change operation (S10) to the display process (S30) will be described below with reference to FIGS. 4 to 10.

The operation setting method of the press machine 1 illustrated in FIG. 4 indicates a result of performing input operation on the second image 50 in the setting change operation (S10), executing a determination process (S20) for determining whether the slide operation and the movement operation are settable, and executing a display process (S30) for displaying a relative position of the third region 53 and the third image 60 on the display 22 as a determination result by the determination process (S20). By displaying the relative position of the first image 40, the second image 50, and the third image 60 after the change on the display 22, for example, the relative position of the third region 53 and the third image 60 as a result of the determination, it is possible for the operator to visually easily recognize the possibility of interference between the moving device 72 and the press machine 1 in consideration of the delay time, which enables simple, quick and reliable setting value change work regardless of the operator's experience value and skill level.

Depending on changes in the technology and demand trends of the products manufactured by the press machine 1, it may be required to increase the product output (product production volume per unit time). Further, as the working styles of workers at the manufacturing site where the press machine 1 is used are diversified, it may be required to maintain or improve high productivity even for a short time. That is, in response to a change speed of the social conditions, there is an increase in the need to flexibly execute the review of the product production plan.

Under such circumstances, "a case where the specifications are changed from a mechanical press to a servo press" is conceivable.

(1) A case where the specifications are changed from a mechanical press to a servo press In this case, in the machine press machine of the crank constant speed operation, the operation by the pendulum operation that repeats the forward rotation motion and the reverse rotation motion of the crankshaft 5 becomes possible by using the servo motor.

In this pendulum operation, the SPM (number of slide strokes per one minute) can be increased, so that an increase in product output is expected. However, it is also necessary to adapt the operating conditions (feed speed, feed acceleration, etc.) of the moving device 72 that feeds the workpiece material 74 into the press machine 1 to the increasing SPM (SPM during pendulum operation is approximately equal to cycle SPM). At this time, by using a setting image such as the invention, it is possible to simply, quickly and reliably execute the setting of the operation condition of the moving device 72, which further draws out the production capacity of the press machine 1 while avoiding the possibility of interference between the press machine 1 and the moving device 72. As a result, it is possible to flexibly accommodate the review of the product production plan.

Further, in an environment in which the press machine 1 adopts the pendulum operation from the beginning, "a case of further increasing the product output" is conceivable.

(2) A case of further increasing the product output

It is conceivable to shorten the pendulum stroke length (lower the inverted position of the pendulum operation) or increase the crank angular velocity during the pendulum operation, in order to further increase the product output while taking into account the proper maintenance of the processing quality of the product. In any of the measures, the setting change similar to the case of the specification change described above need to be executed on the moving device 72. In such a case as well, by using a setting image such as the invention, it is possible to simply, quickly and reliably perform the setting of the operation condition of the moving device 72, which further draws out the production capacity of the press machine 1 while avoiding the possibility of interference between the press machine 1 and the moving device 72.

As described above, according to the invention, it is possible to construct a flexible product production system in response to ever-changing technology/demand trends and social conditions.

Referring back to FIGS. 4 to 11, in the setting change operation (S10), the user interface 24 can change the movement start position of the movement operation by moving the starting end 51a of the first region 51 in accordance with the input operation (for example, moving the finger 80 to the lower part of the figure along the second image 50). The user interface 24 can change the movement completion position by moving the terminating end 51b of the first region 51. When the movement start position or the movement completion position is changed, the processor 26 executes the determination process (S20) for determining whether the movement operation after the change is settable with respect to the slide operation, and executes display process for displaying at least the second image 50 and the third image 60 after the change on the display 22 as a determination result of the determination process (S20). In this way, the operator may visually recognize whether the movement operation after the change is settable with respect to the slide operation when the set value from the start of the movement to the completion of movement of the workpiece material 74 is changed, so that the operator may change the set value with confidence.

As illustrated in FIG. 5, in the setting change operation (S10), the user interface 24 can change the inverted position of the pendulum operation by moving at least one end 41a of the pendulum-type slide operation region 41 in accordance with the input operation (for example, moving the one end 41a to the lower part of the figure along the first image 40 by the finger 80). The input operation may move the other end 41b. Then, the time available for the movement operation becomes shorter when the inverted position is changed, thus the processor 26 executes the determination process (S20) for determining whether the movement operation is settable with respect to the slide operation after the change, and executes the display process (S30) for displaying, on the display 22, the first image 40, the second image 50, and the third image 60 after the change as a determination result by the determination process (S20). In this manner, the operator may visually recognize whether the movement operation is settable with respect to the slide operation after the change when the inverted position of the pendulum operation is changed, so that the operator may change the inverted position with confidence.

As illustrated in FIG. 6, in the setting change operation (S10), the user interface 24 can move the display position of the third image 60 in accordance with the input operation. The third image 60 can be changed in accordance with the replacement of the die. When the third image 60 includes the left side of the bottom dead center 18 as the first straight line 60a and the right side as the second straight line 60b in FIG. 6, it is also possible to move only the second straight line 60b upward with the finger 80. Then, when the display position of the third image 60 is changed by the input operation for the user interface 24, the processor 26 executes the determination process (S20) for determining whether the movement operation is settable with respect to the slide operation after the change, and executes display process (S30) for displaying at least the third image 60 and the second image 50 after the change on the display 22 as a determination result of the determination process (S20). In this manner, the operator may visually recognize whether the movement operation is settable when the third image 60 related to the interference position is moved, so that the operator may change the display position of the third image 60 with confidence.

As illustrated in FIG. 7, in the setting change operation (S10), the user interface 24 can divide the pendulum-type slide operation region 41 in the first image 40 into a plurality of slide operation regions 410, 412 and 414, and change the set speed of the slide 3 by changing the width for each of the divided respective regions. Also, a boundary of divided adjacent slide operation regions is movable along the direction in which the first image 40 extends in accordance with input operation to the user interface 24. Then, when the first image 40 is changed by the input operation for the user interface 24, the processor 26 executes the determination process (S20) for determining whether the movement operation is settable with respect to the slide operation after the change, and executes the display process (S30) for displaying, on the display 22, the first image 40, the second image 50, and the third image 60 after the change as a determination result by the determination process (S20). In this manner, the operator may visually recognize whether the movement operation is settable when the first image 40 is divided and the width of the first image 40 is changed, so that the operator may change the first image 40 with confidence.

As illustrated in FIG. 8, in the setting change operation (S10), a numerical value of the reference SPM in the numerical display region 500 can be changed by the input operation for the user interface 24. Then, when the numerical display region 500 is changed by the input operation for the user interface 24, the processor 26 executes the determination process (S20) for determining whether the movement operation is settable with respect to the slide operation after the change, and executes the display process (S30) for displaying, on the display 22, the first image 40, the second image 50, and the third image 60 after the change as a determination result by the determination process (S20). In this manner, the operator may visually recognize whether the movement operation is settable when the reference SPM value is changed, so that the operator may change the reference SPM value with confidence.

Furthermore, the display process (S30) may display at least one of the distance information and the time information as the determination element in the determination result display region 54 of the display 22. By displaying information such as distance information, the operator may specifically recognize the clearance of the movement operation with respect to the slide operation, so that more detailed motion setting is settable.

The image of the display 22 illustrated in FIG. 9 can execute each of the processes (S10 to S30) described with reference to FIGS. 4 to 8. Since the image of the display 22 illustrated in FIG. 10 is not a pendulum-type, a change of the inverted position in FIG. 5 cannot be performed, but the same operation as those of the processes (S10 to S30) described with reference to FIGS. 4 and 6 to 8 can be performed.

The invention is not limited to the above-described embodiments, and various modifications can be made. The invention includes configurations that are substantially the same (for example, in function, method, and results, or in objective and effects) as the configurations described in the embodiments. The invention also includes configurations obtained by replacing non-essential elements of the configurations described in the embodiments with other elements.

The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

What is claimed is:

1. A press machine configured to perform press processing by converting rotation of an electric motor into reciprocating linear motion of a slide by an eccentric mechanism that converts rotational motion into linear motion, the press machine comprising:
   a user interface configured to accept an input operation;
   a display configured to display a plurality of images; and
   a processor configured to generate the plurality of images corresponding to a slide operation of the slide and a movement operation of a workpiece material input from the user interface,
   the plurality of images displayed on the display including: a first image which has an annular shape, corresponds to a rotational operation of the eccentric mechanism and represents one stroke of the slide operation; a second image which has an arc shape and is concentric with the first image; and a third image displayed on the second image or on an extension line of the second image near a starting end and a terminating end of the second image,
   the first image including at least one slide operation region,
   the second image including a first region corresponding to the movement operation linked with the press machine, a second region coupled to a terminating end of the first region, and a third region coupled to a terminating end of the second region,
   the first region representing a movement time required for the movement operation,
   the third region representing a stop time required for a slide stop process for stopping the slide when the movement operation is defective,
   the second region representing a delay time until the slide stop process starts after the movement time elapses, and
   the processor is configured to display the third image on the display as a determination element for determining whether the slide operation and the movement operation are settable in a relationship between the slide operation and the movement operation based on an input from the user interface.

2. The press machine according to claim 1, wherein
   the third image includes at least one straight line extending in a horizontal direction, and
   the display is configured to indicate that the slide operation and the movement operation are settable by displaying the third region above the straight line, and indicate that the slide operation and the movement operation are not settable by displaying at least a portion of the third region below the straight line.

3. The press machine according to claim 1, wherein
   the user interface is configured to be capable of changing a movement start position of the movement operation by moving a starting end of the first region in accordance with the input operation, and
   the processor is configured to, when the movement start position is changed, execute a determination process for determining whether the movement operation after the change is settable with respect to the slide operation, and execute a display process for displaying the second image and the third image after the change on the display as a determination result of the determination process.

4. The press machine according to claim 1, wherein
   the user interface is configured to be capable of moving a display position of the third image in accordance with the input operation, and
   the processor is configured to, when the display position of the third image is changed by the input operation to the user interface, execute a determination process for determining whether the movement operation is settable with respect to the slide operation after the change, and execute a display process for displaying the third image and the second image after the change on the display as a determination result of the determination process.

5. The press machine according to claim 1, wherein
   the slide operation region is a pendulum-type slide operation region corresponding to a pendulum operation of the eccentric mechanism,
   the user interface is configured to change an inverted position of the pendulum operation by moving at least one end of the pendulum-type slide operation region in accordance with the input operation, and
   the processor is configured to, when the inverted position is changed, execute a determination process for determining whether the movement operation is settable with respect to the slide operation after the change, and execute a display process for displaying the first image, the second image and the third image after the change on the display as a determination result of the determination process.

6. The press machine according to claim 3, wherein
   the display process includes further displaying at least one of distance information and time information on the display as the determination element.

7. The press machine according to claim 4, wherein
   the display process includes further displaying at least one of distance information and time information on the display as the determination element.

8. The press machine according to claim 5, wherein
   the display process includes further displaying at least one of distance information and time information on the display as the determination element.

9. An operation setting method of a press machine which performs press processing by converting rotation of an electric motor into reciprocating linear motion of a slide by an eccentric mechanism that converts rotational motion into linear motion,
   a processor of the press machine displaying on a display:
   a first image which has an annular shape, corresponds to a rotational operation of the eccentric mechanism and represents one stroke of a slide operation; a second image which has an arc shape, and is concentric with the first image; and a third image displayed on the second image or on an extension line of the second image near a starting end and a terminating end of the second image, the processor determining whether the slide operation and a movement operation are settable in a relationship between the slide operation and the movement operation of a workpiece material based on an input operation from a user interface, the processor executing a process for displaying the first image, the second image and the third image on the display after a change as a result of the determination, the first image including at least one slide operation region, the second image including a first region corresponding to the movement operation linked with the press machine, a second region coupled to a terminating end of the first region, and a third region coupled to a terminating end of the second region, the first region representing a movement time required for the movement operation, the third region representing a stop time required for a slide stop process for stopping the slide when the movement operation is defective, and the second region representing a delay time until the slide stop process starts after the movement time elapses.

* * * * *